United States Patent
Leather et al.

(10) Patent No.: US 7,280,119 B2
(45) Date of Patent: Oct. 9, 2007

(54) METHOD AND APPARATUS FOR SAMPLING ON A NON-POWER-OF-TWO PIXEL GRID

(75) Inventors: Mark M. Leather, Saratoga, CA (US); Eric Demers, Palo Alto, CA (US)

(73) Assignee: ATI Technologies Inc., Markham, Ontario (CA)

( * ) Notice: Subject to any disclaimer, the term of this patent is extended or adjusted under 35 U.S.C. 154(b) by 0 days.

(21) Appl. No.: 10/778,782

(22) Filed: Feb. 13, 2004

(65) Prior Publication Data

US 2004/0183816 A1 Sep. 23, 2004

Related U.S. Application Data

(60) Provisional application No. 60/447,861, filed on Feb. 13, 2003.

(51) Int. Cl.
*G09G 5/00* (2006.01)
*G06T 15/50* (2006.01)
*G06T 5/00* (2006.01)
*G06T 11/40* (2006.01)

(52) U.S. Cl. .................. 345/611; 345/421; 345/426; 345/428; 345/611; 382/254; 382/269

(58) Field of Classification Search ........ 345/611–614, 345/428, 418, 421, 426, 581–588, 622; 382/254, 382/266, 268–269, 274–275
See application file for complete search history.

(56) References Cited

U.S. PATENT DOCUMENTS

| | | | | |
|---|---|---|---|---|
| 6,057,855 A | * | 5/2000 | Barkans ...................... | 345/629 |
| 6,184,889 B1 | * | 2/2001 | D'Amora ..................... | 345/419 |
| 6,720,975 B1 | * | 4/2004 | Dietrich, Jr. ................ | 345/611 |
| 2002/0140706 A1 | * | 10/2002 | Peterson et al. ............ | 345/611 |
| 2003/0095134 A1 | * | 5/2003 | Tuomi et al. ............... | 345/611 |
| 2003/0164840 A1 | * | 9/2003 | O'Driscoll .................. | 345/611 |
| 2003/0212677 A1 | * | 11/2003 | Chen et al. .................... | 707/6 |
| 2004/0100466 A1 | * | 5/2004 | Deering ...................... | 345/428 |

* cited by examiner

*Primary Examiner*—Wesner Sajous
(74) *Attorney, Agent, or Firm*—Vedder, Price, Kaufman & Kammholz, P.C.

(57) ABSTRACT

The embodiments of the present invention are a method and apparatus to perform anti-aliasing using multi-sampling on a non-power-of-two pixel grid. Using the present invention with 6 sample multisampling gives the same visual anti-aliasing quality as 8 samples using a prior art technique but uses less memory. A non-power-of-two equally spaced sample from a conventional grid of size N×N, where N is 12 can be chosen using the present invention. A scan conversion to determine the set of pixels covered by a polygon is performed in two parts. According to one embodiment, the present invention can multiply and divide by "N" in order to multisample an image using samples per pixel chosen from a N×N sub-sample grid, where "N" is not necessarily a power of 2. The present invention performs the divide by "N" step, where the step is achieved using a quick divide by 3 or 12 technique.

7 Claims, 5 Drawing Sheets though the number of subsamples taken in the grid is also a power of two such as 1, 2, 4, or 8 samples per pixel depending on the precision needed. Prior art uses a power of two because multiplies and divides are shifts and adds, which are easy and fast to perform in a digital binary system.

METHOD AND APPARATUS FOR SAMPLING ON A NON-POWER-OF-TWO PIXEL GRID

CROSS-REFERENCE TO RELATED APPLICATIONS

The present application claims the benefit of priority from now abandoned, U.S. Provisional Pat. application Ser. No. 60/447,861, entitled Method for Sampling On A Non-Power-of-Two Pixel Grid, filed on Feb. 13, 2003, which is herein incorporated by reference in its entirety.

BACKGROUND OF THE INVENTION

1. Field of the Invention

The present invention relates to the field of computer graphics, and in particular to a method and apparatus for sampling on a non-power-of-two pixel grid.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

In the field of computer graphics, there are conventionally two methods for reducing stair step like lines that should be smooth. These step like lines are called artifacts, aliases, or jaggies, and the two conventional methods are antialiasing and smoothing. Jaggies occur because the output devices such as a monitor or printer do not have a high enough resolution to represent a smooth line.

Smoothing

Smoothing is a technique used by some printers to make curves look smoother. Most printers that support smoothing implement it by reducing the size of the pixels that make up a curved line. In addition, some printers can also alter the horizontal alignment of the dots to minimize jaggies.

Antialiasing

Antialiasing, which is sometimes called oversampling, is a software technique for diminishing jaggies by surrounding the stair steps with intermediate shades of gray or color. Although this reduces the jagged appearance of the lines, it also makes them fuzzier. In order to do antialiasing, it is necessary to sample the pixels using a sampling technique, for example multisampling or super sampling. Multisample antialiasing is useful for rendering polygons, because it requires no sorting for hidden surface elimination, and it correctly handles adjacent polygons, object silhouettes, and even intersecting polygons. If only points or lines are being rendered, the "smooth" antialiasing mechanism provided by the base GL may result in a higher quality image, and allow multisample and smooth antialiasing techniques to be alternated during the rendering of a single scene. Furthermore, the quality of the multisampled frame buffer can be selected by specifying the pixel format to the desired number of samples per pixel.

In current computer graphics, antialiasing includes a pipeline starting from an application and ending in the display of a given image. This pipeline is illustrated in FIG. 1, where step 100 shows the application used to render the graphics. Step 110 is the commands of the application used to render the graphics. Step 120 is the calculation of the geometry that best covers the graphics to be rendered. Step 130 rasterizes the graphics. Step 140 calculates the texture (if any) for the given graphics. Step 150 is the breaking up of the graphics into smaller pieces or fragments before it is displayed at step 160.

Conventionally, when an image pixel is sampled using a multisampling approach it is first subdivided into a sample grid of size N×N. "N" is a power of two so that the grid might be, e.g. 4×4, 8×8, 16×16, etc. Typically, the number of subsamples taken in the grid is also a power of two such as 1, 2, 4, or 8 samples per pixel depending on the precision needed. Prior art uses a power of two because multiplies and divides are shifts and adds, which are easy and fast to perform in a digital binary system.

Model View Projection Transform

One prior art method for performing antialiasing is the model view projection transform, which can be broken up into four steps. The first step is to convert all objects in a given projection field to a model coordinate system. For example, if the screen of a monitor were to be a window, then the model coordinate system would be the size of the screen in two dimensional coordinates, and a reference point on the screen—maybe the bottom left corner—is chosen and given coordinates 0, 0. The extremities of all the objects within this screen would be referenced to this reference point, or in other words the coordinates of the extremities of all the objects within this screen is calculated based on the 0,0 coordinates of the reference point. Next, the viewer is placed within this projection field, and all objects within this field are now referenced with respect to the viewer. This means that all objects within the projection field are referenced with respect to the height of the viewer, the direction faced by the viewer, and the two dimensional distance each object has to the placement of this viewer within the field. Next, the perspective of the projection of each object is taken into account. For example, an object further away from the viewer appears smaller than an object closer to the viewer. Also, objects behind other opaque objects are hidden from the perspective view of the viewer. Finally, a projective divide takes the end points of all the objects and maps them to a two dimension coordinate display grid.

Good conventional computer graphics sample an image using 8 samples per pixel. But this requires large amounts of data to be processed, stored and moved around on a system bus, which reduces the effective bandwidth per pixel of the system. What is needed is a sub-sample frequency N of size smaller than 8 which gives the same if not better results than a sub-sample frequency of size 8, and also uses less bandwidth per pixel.

SUMMARY OF THE INVENTION

The embodiments of the present invention are a method and an apparatus to perform anti-aliasing using multi-sampling on a non-power-of-two pixel grid using a non power of two sub-sample rate. According to one embodiment, the present invention with 6 sample multisampling generally gives similar antialiasing quality and uses less bandwidth per pixel as a prior art technique using 8 samples. This results in smaller storage requirements, faster processing, and less data being transferred on a system bus, reducing bandwidth. According to another embodiment, a non-power-of-two equally spaced samples from a sample grid of size N×N, where N could be 12 or a multiple thereof can be chosen using the present invention. A 12×12 grid is smaller than a 16×16 grid typically used with an 8 sub-sample frequency. This smaller grid further reduces processing requirements of a graphics system, reducing cost while maintaining visual output performance and improving operational performance. According to another embodiment of the present invention, a scan conversion to determine the set of pixels covered by a polygon is performed in two parts. The two parts are the multiplication and division by "N" in order to multisample an image using samples per pixel chosen from a N×N sub-sample grid, where "N" is not necessarily a power of 2. According to another embodiment, the divide by "N" step is achieved using a divide by 3 or divide by 12 (which is divide by 3 with two shifts) technique.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
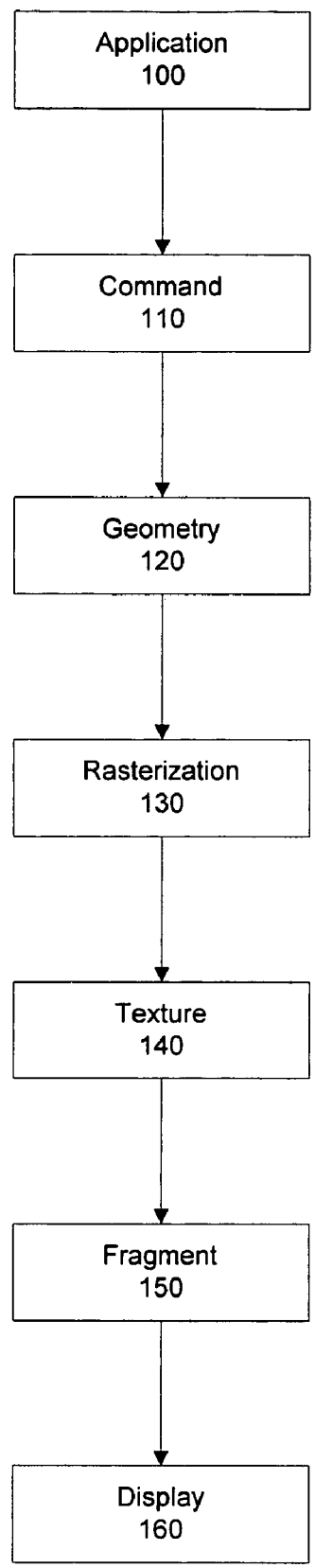
FIG. 1 is a flowchart showing the pipeline of antialiasing in prior art computer graphics.

The embodiments of the present invention are a method and apparatus to perform anti-aliasing using multi-sampling on a non-power-of-two pixel grid. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

6 Subsamples

As noted above, a drawback with using prior art multi-sampling techniques is that large amounts of data are processed and moved on a system bus, which results in the increase of bandwidth per pixel of the system. The present invention solves this drawback by using a method for sub-sampling with fewer than 8 subsamples while maintaining acceptable performance and resultant images. The typical candidate to reduce the number of samples in the prior art would be four sub-samples to maintain the power of two relationship for processing purposes. However, using only four sub-samples does not provide adequate visual results for the output image. The present invention provides a method of using 6 subsamples, a non-power of two value. The smaller number of samples reduces the size of memory required for processing by a factor of 25% versus 8 subsamples. The bus bandwidth is also improved since less data need be transferred per operation.

Non Power of Two Grid

The present invention provided optimum quality for non-power of two samples, by using a non-power of two grid from which to select the subsample points. In one embodiment, the invention uses a 12×12 subsample grid for each pixel. 12 is the minimum grid size that can accommodate sub-sample rates of 1, 2, 4, and 6. In other embodiments, an N×N grid is used, where N is 12 or a multiple thereof.

When using the 12×12 subsample grid with the 6 sample embodiment, optimal quality is achieved by selecting sample points such that they are (a) well distributed spatially, and (b) evenly distributed horizontally and vertically at ⅙ pixel intervals. A number of known methods exist for scattering sample points in this manner, including the so-called sparse sampling method, and the so-called "rook and queen" algorithms.

Lossless Antialiasing

The antialiasing of the non power of two grid performed using the above example is a lossless antialiasing. This means that none of the subsamples are lost or combined with other subsamples. For example, if two triangles cut across a pixel, then the present invention knows which subsamples are covered by each triangle, and the information is remembered. Now, if a third triangle comes along and cuts through this pixel again, the present invention again checks to see which subsamples are touched by the new triangle. None of the subsample data retrieved from the three triangles are combined until the pixel needs to be displayed. Basically, for each triangle, there is a mask that indicates which subsamples belong to it, and there is a single color for all those subsamples, and a unique Z value for each subsample that this triangle covers. This means that no information is lost, regardless of the number of triangles that "cut" through the pixel.

At the worst, every single subsample has its own unique color (which triangle it belongs to) and Z value. The final stage involves combining all the subsample information into the final pixel color and is called a resolve. In the resolve phase, the system figures out the amount of red from all the subsamples and computes the final red value of the pixel. The same is repeated for blue and green. This lossless antialiasing is hence accomplished by computing how much coverage there is per pixel, for example, 60% white and 40% black (or the percentages of red, blue, and green), and which part of the pixel is covered.

Figure 5:
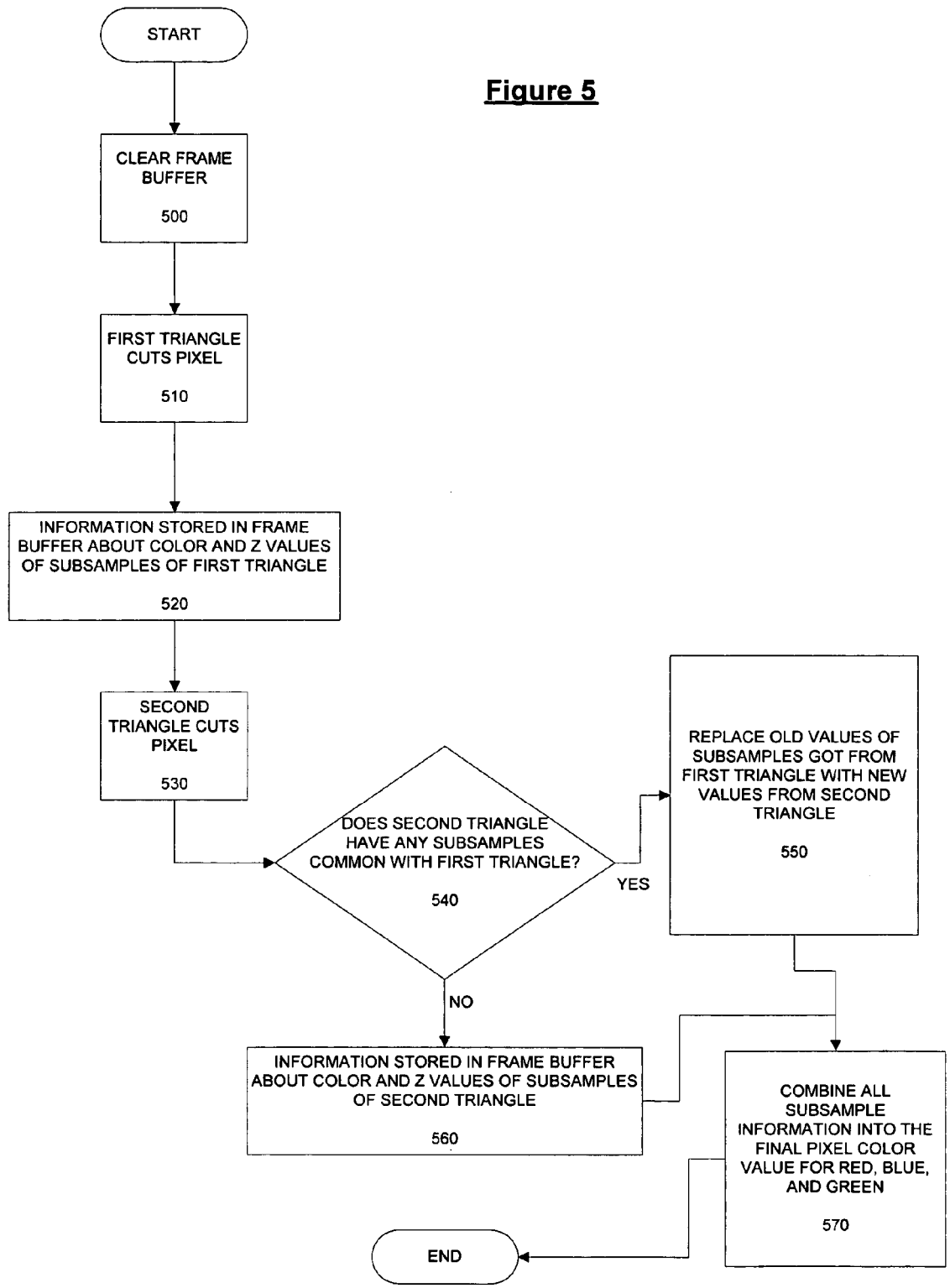
FIG. 5 is a flowchart showing the lossless antialiasing according to an embodiment of the present invention.

FIG. 5 illustrates the above case, where at step 500, all subsamples are cleared from the frame buffer. At step 510, a first triangle "cuts" through the pixel. At step 520, information is stored into the frame buffer of the subsamples covered by the first triangle, what their colors are and all their Z values. At step 530, a second triangle "cuts" through the pixel. At step 540, a check is made to see if the second triangle has any subsamples common with the first triangle. If there are any common subsamples with the first triangle (the "yes" branch), then at step 550, the old value of all common subsamples are replaced with the new values of second triangle. If, on the other hand, there are no common subsamples (the "no" branch), then at step 560 information is stored into the frame buffer of the subsamples covered by the 2nd triangle, what their colors are and all their Z values. Finally, at step 570, all the subsample information is combined into the final pixel color value by computing the final red, blue, and green values of the pixel.

Bounding Box

A bounding box defines an area within a pixel that a polygon must cross or touch so that it will trigger a subsample. In other words, if a polygon crosses a bounding box, it may cover one or more subsamples. The converse is that if a polygon crosses a pixel, but not a bounding box, then it will not generate any pixel data for that pixel. Thus, the bounding box is an optimization for rendering performance.

The bounding box is programmed to be the smallest rectangle completely enclosing all of the sample points with the pixel. Typically this will be a little smaller than the pixel itself, thus improving performance.

In operation taking a N×N grid, where N is 12 and contains potentially 144 subsamples, the 2, 4, or 6 subsamples are chosen using one of the many publicly available algorithms run on one of many commercially available hardware so that no two subsamples are adjacent to each other or belong to the same row or column of the grid, and are evenly distributed throughout the grid. Next, a bounding box may be defined to optimized speed, and does not affects the antialiasing or any other aspect of the algorithm.

Figure 2:
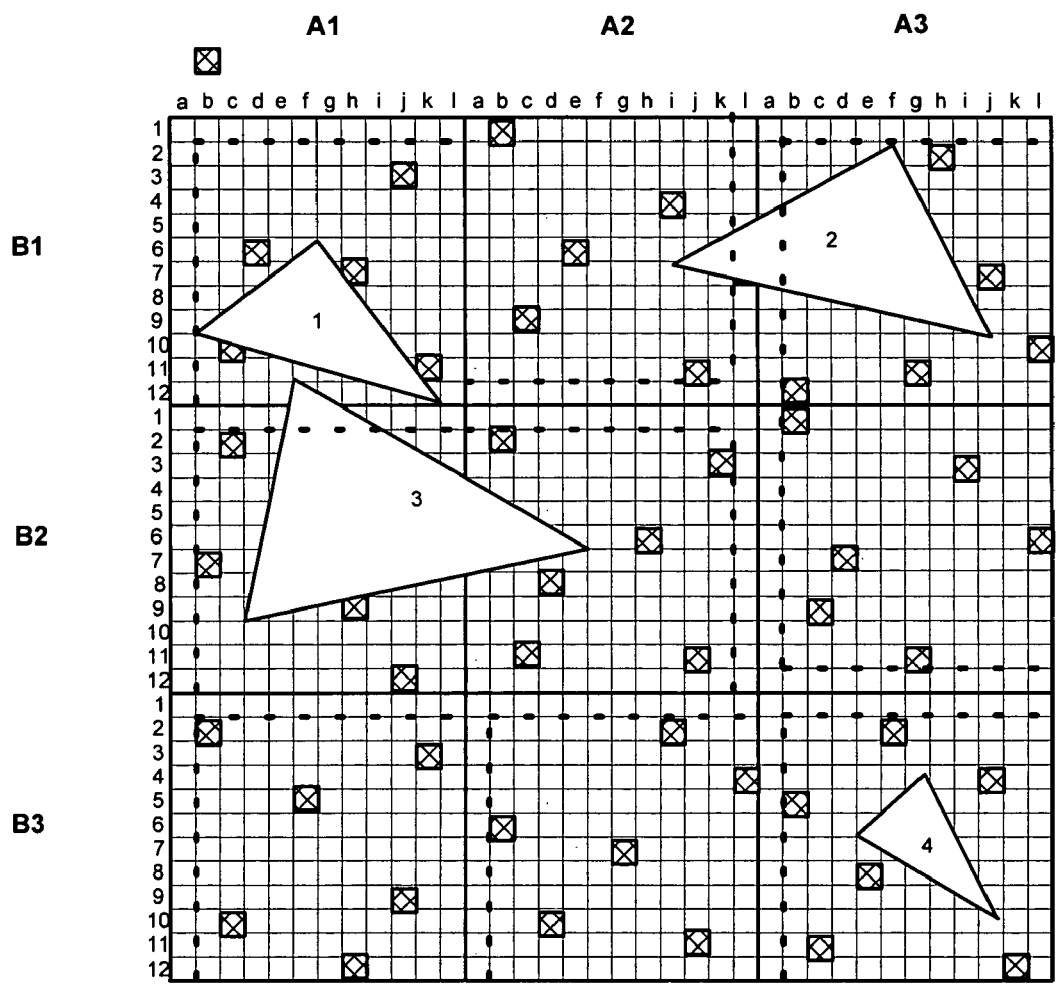
FIG. 2 illustrates a collection of pixels each divided into a 12×12 grid according to an embodiment of the present invention.

FIG. 2 illustrates a collection of 9 pixels, each divided into a 12×12 grid with columns numbered from a through 1, and rows numbered from 1 through 11. The pixels are numbered vertically A1, A2, A3, and so on, and horizontally B1, B2, B3, and so on. The 9 pixels shown in the figure can be named pixel A1B1, A2, B1, A3B1, A1B2, A2B2, A3B2, A1B3, A2B3, and A3B3, where pixel A1B1 is the top left corner pixel, pixel A1B2 is the leftmost pixel in the middle row, and so on. The 12×12 grid of each pixel contains a bounding box, which is usually a square and covers most of the pixel. The bounding boxes of each of the 9 pixels are shown by a bold dashed line. So, for example, the bounding box of pixel A1B1 is bounded by columns b and 1 and rows 2 and 11. Each bounding box has 6 subsamples that are chosen using one of the many commercially available algorithms, such that the subsamples are evenly distributed within each bounding box. These subsamples are hashed in the figure. So, for example pixel A1B1 has 6 subsamples, namely j3, d6, h7, c10, k11, and another subsample that is covered by shape 1.

Geometric shaped structures numbered 1, 2, 3, and 4 are defined by the 9 pixels of FIG. 2. Structures 1 and 4 lie completely within the bounding boxes of pixels A1B1 and A3B3 respectively. Structure 1 touches the bounding box of pixel A1B1 and some of the subsamples and hence generates subsample data, but structure 4 does not touch the bounding box of pixel A3B3, nor does it cover any of the subsamples of that pixel and hence does not generate any subsample data. Structures 2 and 3 cross the bounding boxes of 2 or more pixels. For example, structure 2 crosses the bounding boxes of pixels A2B1 and A3B1. After the algorithm evaluates a pixel, it goes to the next pixel of the polygon. After the last pixel has been evaluated, the rasterization of that polygon is complete, and the system goes on to evaluate the next polygon.

Figure 3:
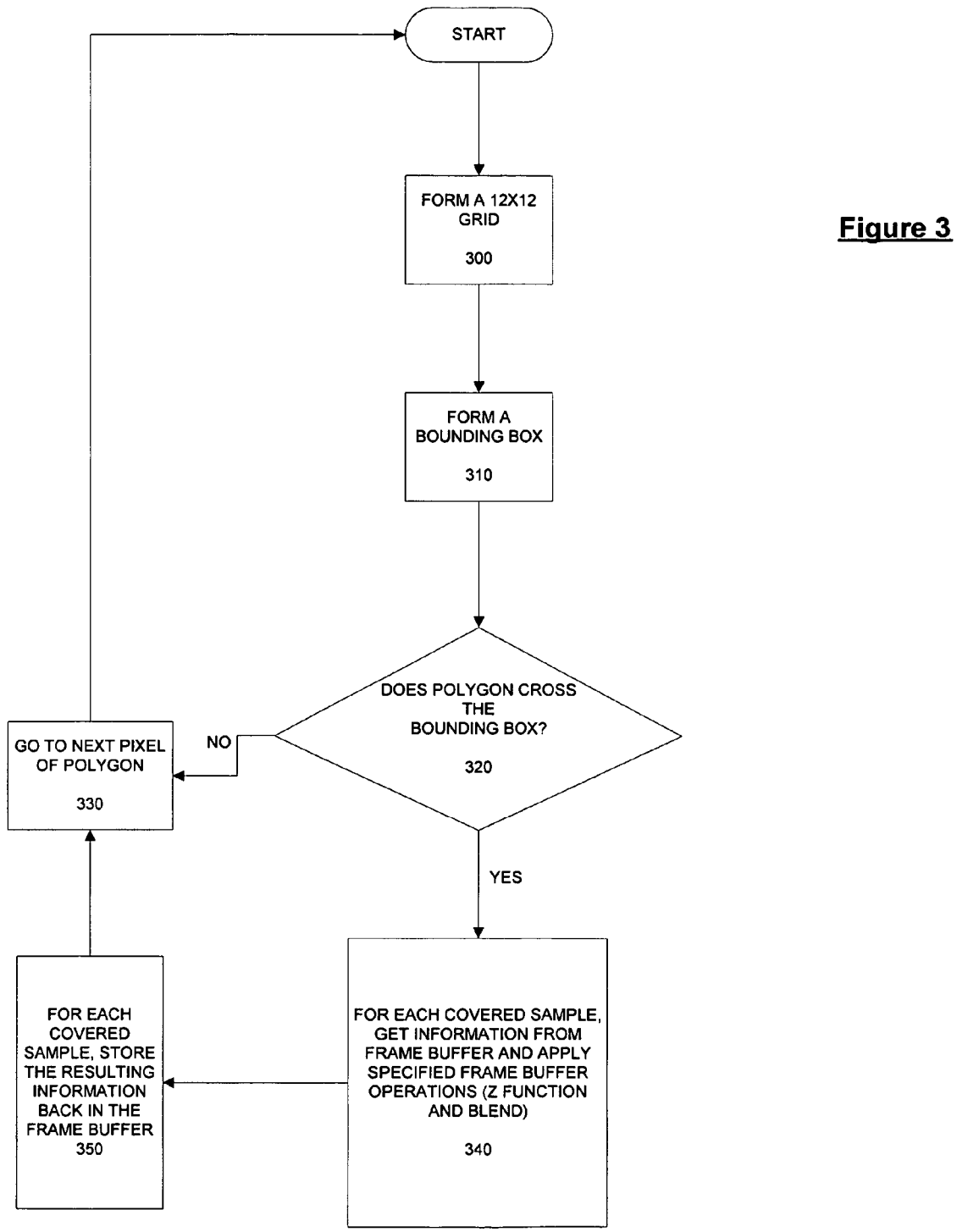
FIG. 3 is a flowchart showing the lossless antialiasing according to one embodiment of the present invention.

This lossless antialiasing can be visually seen in the flowchart of FIG. 3. At step 300 the 12×12 grid is created. Next, at step 310, after the sub-sample points are selected, the bounding box is generated within the grid. Next, at step 320, the check to see if any part of a polygon has crossed the bounding box of a pixel. If the polygon does not cross a bounding box (the "no" branch), then the algorithm moves to the next pixel of the polygon, and the routine is restarted from the top. If, on the other hand, a polygon crosses a bounding box (the "yes" branch), then the previous information (Z and color) of the pixels that make up the portion of the polygon that crosses the bounding box are retrieved from the frame buffer at step 340. At step 350, the Z and color information of the pixels are stored in the frame buffer and the routine is restarted from the top.

The lossless antialiasing algorithm of the present invention gives the amount of frame buffer memory required and is the product of the number of pixels and the number of subsamples. For example, a 6 subsample antialiasing algorithm like the one implemented in the present invention uses 25% less buffer memory and 25% less bandwidth per pixel than a conventional algorithm that uses 8 subsamples.

Scan Conversion

The present invention uses a rasterization process to evaluate the information gathered on each pixel in other to write them. The rasterization process involves scan conversion, which is the process of determining the sets of pixels covered by the polygon, and is a two part process.

The first part is called course rasterization, which is a step that looks typically at an area of size 8×8 pixels and figures out the relationship of the polygon with respect to this area. It tries to see if the polygon whether the polygon lie completely within this area, partially in this area, or completely outside this area? If the polygon does not touch the area at all, the area is discarded. In this step, the upper and lower bounds of the polygon in pixel space are first computed by taking the minimum and maximum "y" values of the vertices, and then dividing by the dimension of one side of the sample grid (i.e. N in a N×N sample grid). In the next step, for each horizontal strip, the left and right bounds of the polygon are computed by calculating the minimum and maximum "x" values of the vertices, and then dividing by N. The set of pixels between the left and right bounds of the polygon for each horizontal strip between the upper and lower bounds of the polygon defines the full set of covered pixels. Then, in order to determine if a sample is inside or outside the polygon, the sample's pixel position is multiplied by N and the sample offset is then added. Take for example a sample that is the $5^{th}$ sample in the $7^{th}$ pixel (from left to right), with a sample grid of 12×12. The sample point position is obtained by multiplying 7 (the sample's pixel position)×12 (N)+5 (sample offset). This sample point is used to construct edge equations for each of the polygon edges. If the edge equations are all greater than zero, the point is inside the polygon. If one or more of the edge equations are less than zero, the point is outside the polygon.

Figure 4:
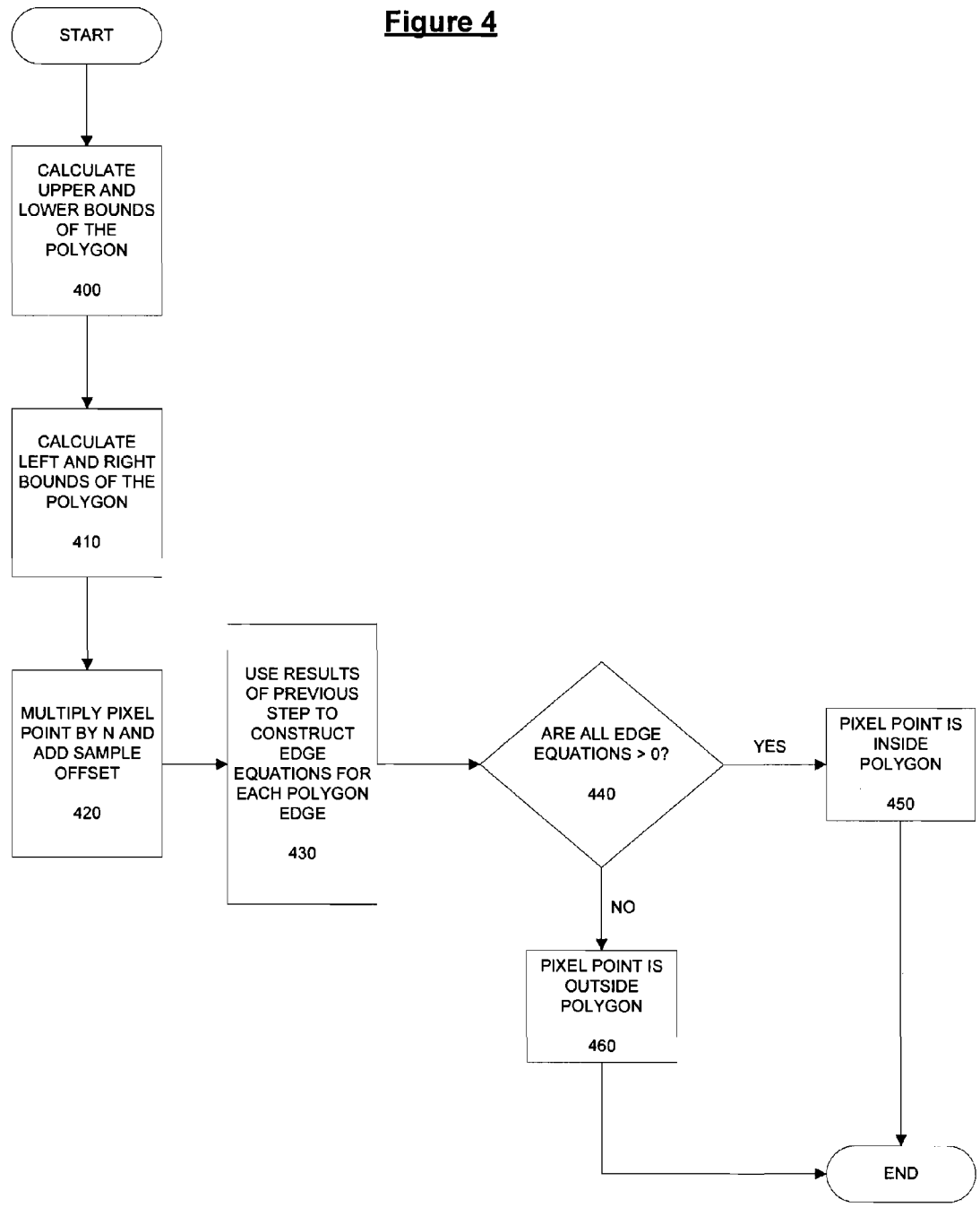
FIG. 4 is a flowchart showing the scan conversion steps according to an embodiment of the present invention.

The scan conversion steps are illustrated in the flowchart of FIG. 4, where at step 400 the upper and lower bounds of the polygon are calculated. As explained above, the minimum and maximum "y" values of the polygon are chosen and divided by the dimension of one side of the sample grid (N in a N×N grid). Next, at step 410 the left and right bounds of the polygon are calculated. As explained above, the leftmost and rightmost "x" values of the polygon are chosen and divided by the dimension of one side of the sample grid (N in a N×N grid). Next, at step 420 the pixel position of the sample is multiplied by N and the sample offset is added to the result. Next, at step 430 the value derived at step 420 is used to calculate the edge equations for each of the polygon edges. Next, at step 440 a check is made to see if all edge equations derived for the sample point at step 430 are greater than zero. If all edge equations derived for the sample point are greater than zero, then it is concluded at step 450 that the pixel point lays inside the polygon. If, on the other hand, there are one or more edge equations that are less than zero, then it is concluded at step 460 that the pixel point lays outside the polygon.

We claim:

1. A method for performing multi-sampling for antialiasing, comprising:

using a sample grid of a non-power-of-two dimension per pixel to sample a polygon;

distributing a non-power-of-two plurality of sub-samples within said sample grid.

2. The method of claim 1 further comprises:
creating a bounding box less than or equal to the size of said sample grid.

3. The method of claim 2 wherein said sub-samples are distributed within said bounding box.

4. The method of claim 3 wherein said bounding box guarantees that if said polygon crosses the boundary of said bounding box, said polygon covers at least one said sub-sample.

5. The method of claim 4 further comprising:
checking whether said polygon crosses the boundary of said bounding box;
getting previous pixel information from a frame buffer if said polygon crosses the boundary of said bounding box;
recording said information in said frame buffer.

6. The method of claim 1 wherein said non-power-of-two sample grid is of size 12×12, or multiple thereof.

7. A method for performing multi-sampling for anti-aliasing, comprising:
using a sample grid of a non-power-of-two dimension per pixel to sample a polygon;
creating a bounding box less than or equal to the size of said sample grid;
distributing a plurality of sub-samples within said sample grid, wherein said sub-samples are distributed within said bounding box and wherein said bounding box guarantees that, if said polygon crosses the boundary of said bounding box, said polygon covers at least one said sub-sample
and checking whether said polygon crosses the boundary of said bounding box;
getting previous pixel information from a frame buffer if said polygon crosses the boundary of said bounding box;
recording said information in said frame buffer.

* * * * *